US008074506B2

(12) United States Patent
Maehner et al.

(10) Patent No.: US 8,074,506 B2
(45) Date of Patent: *Dec. 13, 2011

(54) APPARATUS AND METHOD FOR TESTING A TIRE

(76) Inventors: Bernward Maehner, Gilching (DE); Stefan Dengler, Calw-Stammheim (DE)

( * ) Notice: Subject to any disclaimer, the term of this patent is extended or adjusted under 35 U.S.C. 154(b) by 192 days.

This patent is subject to a terminal disclaimer.

(21) Appl. No.: 12/294,815

(22) PCT Filed: Mar. 26, 2007

(86) PCT No.: PCT/EP2007/052878
§ 371 (c)(1),
(2), (4) Date: Nov. 13, 2008

(87) PCT Pub. No.: WO2007/110412
PCT Pub. Date: Oct. 4, 2007

(65) Prior Publication Data
US 2010/0170331 A1  Jul. 8, 2010

(30) Foreign Application Priority Data

Mar. 27, 2006 (DE) .................. 10 2006 014 058

(51) Int. Cl.
*G01M 17/02* (2006.01)
(52) U.S. Cl. ......................................... 73/146
(58) Field of Classification Search .................. None
See application file for complete search history.

(56) References Cited

U.S. PATENT DOCUMENTS 4,936,138 A * 6/1990 Cushman et al. ............... 73/146

(Continued)

FOREIGN PATENT DOCUMENTS

DE  4231578 A1  3/1994
(Continued)

OTHER PUBLICATIONS

International Search Report and Written Opinion for related application No. PCT/EP2007/052878. (ISR/WO).

*Primary Examiner* — Andre Allen
(74) *Attorney, Agent, or Firm* — Stephen B. Salai, Esq.; Brian B. Shaw, Esq.; Harter Secrest & Emery LLP

(57) ABSTRACT

An apparatus for testing a tire (10), which has a center (M), a width (B1, B2) which extends in an axial direction (z) and a diameter ($D_1$, $D_2$) on a tire plane (RME, $RME_1$, $RME_2$, MBE) which is orthogonal to the axial direction (z), is provided with a measuring head (20) which can be used to scan the tire (10). The apparatus also has a positioning means (30) which can be used to position the measuring head (20) in an observation position and to align the measuring head in an observation direction. The positioning means (30) can be controlled with the aid of a control and display device (40). The control and display device (40) has at least one control panel (44, 45, 46, 47) which can be used to input the coordinates of the position of the measuring head (20). Alternatively or additionally, the control and display device (40) has at least one display panel (44, 45, 46, 47) which can be used to display the coordinates of the position of the measuring head (20). The coordinates are determined using a coordinate system whose origin (0) is at the point of intersection of the tire plane (RME, $RME_1$, $RME_2$, MBE) and a roll axis (R) which extends through the center (M) of the tire (10) in the axial direction (z).

25 Claims, 7 Drawing Sheets

U.S. PATENT DOCUMENTS

| | | | |
|---|---|---|---|
| 5,987,978 A * | 11/1999 | Whitehead | 73/146 |
| 6,840,097 B1 | 1/2005 | Huber et al. | |
| 7,302,836 B2 * | 12/2007 | Hattori | 73/146 |
| 7,360,410 B2 | 4/2008 | Steinbichler et al. | |
| 7,568,385 B2 * | 8/2009 | Maehner et al. | 73/146 |
| 2001/0040682 A1 | 11/2001 | Lindsay et al. | |
| 2001/0045125 A1 * | 11/2001 | Alexander | 73/146 |
| 2005/0052657 A1 * | 3/2005 | Braghiroli | 356/602 |
| 2005/0058333 A1 | 3/2005 | Kaneko et al. | |
| 2007/0295071 A1 * | 12/2007 | Iwase et al. | 73/146 |
| 2008/0011074 A1 * | 1/2008 | Braghiroli | 73/146 |
| 2008/0202229 A1 * | 8/2008 | Maehner et al. | 73/146 |
| 2009/0000370 A1 * | 1/2009 | Lionetti et al. | 73/146 |
| 2009/0282905 A1 * | 11/2009 | Dengler et al. | 73/146 |
| 2010/0180676 A1 * | 7/2010 | Braghiroli et al. | 73/146 |

FOREIGN PATENT DOCUMENTS

| | | |
|---|---|---|
| DE | 4232201 A1 | 3/1994 |
| DE | 19944314 A1 | 4/2001 |
| DE | 10333802 A1 | 2/2005 |
| EP | 0440418 A2 | 8/1991 |
| EP | 0547364 A | 6/1993 |
| EP | 1014036 A2 | 6/2000 |
| EP | 1043578 A2 | 10/2000 |
| EP | 1284409 A1 | 2/2003 |
| EP | 1500917 A2 | 1/2005 |
| WO | 9002946 A1 | 3/1990 |

* cited by examiner

Fig. 3         Prior art

APPARATUS AND METHOD FOR TESTING A TIRE

The invention relates to a device for testing a tyre featuring a centerpoint, a width extending in an axial direction and a diameter located in a tyre plane orthogonal to the axial direction. The device which particularly permits testing the tyre by means of a method of interferometric scanning comprises a scanning head for scanning the tyre to obtain a resulting scan. In addition the device comprises a positioning means for moving the scanning head to a selected position, i.e. for positioning in a viewing position and for orienting in a viewing direction. With the aid of a control and display means the positioning means is controllable and in general the resulting scan can be displayed. The invention relates furthermore to a method of testing a tyre in which such a device can find application.

Tyres are subjected to material testing for quality inspection and to reduce safety risks, making it possible to recognize faulty locations, so-called flaws. It is particularly in the case of used tyres to be retreaded that as a rule non-destructive material testing is done, ensuring a relatively fast series inspection. Often employed in industry for this purpose are optical methods of sensing such as, for example, holography or shearography also termed speckle pattern shearing interferometry. Shearography is a relative interferometric scanning method which furnishes an image as the result showing the difference between two conditions of the test object staggered in time. To image the result, nowadays as a rule digitally, due to the increasing popularity of electronic image sensors, such as, for example, CCD sensors, it has thus become necessary to alter the condition of the test object between two scannings by making use of a mechanical, thermal or pneumatic force. Known, for instance, from German patent DE 199 44 314 A1 are testers which for this reason comprise a pressure chamber which is either pressurized or evacuated so that the tyre located in the pressure chamber is deformed due to the change in pressure in thus being transformed from a first reference condition into a second scanned condition.

Unlike holography, shearography does not map the surface deformation of a test object but the gradients of the deformation. This is because shearography employs a so-called shearing element which is a shearoptic assembly, such as, for example, an optical wedge, an optical biprism or a Michelson interferometer generating image doubling, i.e. two images of the test object slightly staggered spatially which are overlayed to produce an interferogram due to the resulting interference. The shearogram characterizing the gradients of the deformation is generated by subtracting the intensities of the interferograms obtained in the reference condition and in the scanned condition, the shearogram indicating whether there has been a change in the location of a point to an adjoining point because of deformation of the test object. If so, this difference in the distance results in a local change in the distribution of the intensity, providing information as to a flaw. Interferometric scanning methods based on speckle interferometry are described in DE 42 31 578 A1 and EP 1 014 036 B1.

A tyre testing apparatus in which a tyre to be tested is arranged without rim and disc in a lying position in a pressure chamber is disclosed in German patent DE 199 44 314 A1. This tyre testing apparatus features an adjustable scanning head which can be positioned at a predefined distance away from the inner circumferential surface, the inner side surface and the outer side surface of the tyre to test the carcass, a belting often sandwiched between the carcass and the tread as well as the sidewall of the tyre. The scanning head features a plurality of illuminator and imaging assemblies which simultaneously test differing sections of the tyre for relatively fast testing.

The imaging assembly of the scanning head is usually a camera featuring a light-sensitive semiconductor sensor, for example a CCD or CMOS sensor. To obtain an informative resulting scan it is necessary that the field of view of the camera and the section of the tyre to be tested are made to conform. This is usually done by the scanning head being positioned in a viewing position and oriented in a viewing direction to ensure, for one thing, that the selected section of the tyre scanned is totally in the field of view of the camera, and for another, so that the sections in sequence adequately overlap to achieve gapless testing. The viewing position and viewing direction of the scanning head depend on the dimensions of the tyre. Known from EP 1 284 409 A1 and DE 103 33 802 A1 are thus devices to make it possible to scan the tyre optically, for example, by means of so-called light slices so as to position and orient the scanning head as a function of the data obtained in this way. The drawback here is the added expense of the hardware needed for scanning the tyre.

It is particularly when tyres of a certain type are put through series testing that it is mostly sufficient to save the dimensions of the tyre specific to the type thereof and the parameters of the scanning head assigned thereto in a test routine loaded for testing each type of tyre concerned in a memory of the control and display means. Although the parameters of the scanning head, i.e. the viewing position and viewing direction need to be defined once only for a certain type of tyre, they depend on a reference system determined by the positioning means of the testing device. It is thus impossible to use the test routines specific to the tyres concerned for any testing device having different positioning means.

On top of this, knowing the parameters of the scanning head is, as a rule, vital for analyzing the resulting scan. For, when the result is, for example, an image showing interference lines or phase difference angles between two conditions of the tested tyre staggered in time, as is known, for example, from EP 1 014 036 B1, then the image of the result in most cases furnishes the viewer no indications as to the spatial location of the test section assigned to the resulting image and thus as to a flaw illustrated therein.

The invention is based on the object of providing a device and a method for testing a tyre sophisticated by simple control of the scanning head and reliable analysis of the resulting scan.

This object is achieved by an device as set forth in claim 1 and by a method as set forth in claim 17. Preferred aspects of the device and of the method read from the claims 2 to 16 and from 18 to 21 respectively.

The device in accordance with the invention for testing a tyre is provided with a scanning head for scanning the tyre to obtain a resulting scan. The scanning head may be configured as described in EP 1 014 036 B1 for testing the tyre by means of a interferometric scanning method. The device in accordance with the invention is provided furthermore with means for positioning the scanning head in a viewing position and orientation thereof in a viewing direction. With the aid of a control and display means the positioning means having, for example, two degrees of translational and rotational freedom are controlled and the resulting scan, existing for instance as a scan image, displayed.

The control and display means comprises at least one user field for entering the coordinates of the position of the scanning head and/or at least one display field for displaying the coordinates of the position of the scanning head. The coordinates are defined by a system of coordinates, the origin of which is located in the intersection of the tyre plane and a rolling axis extending through the middle of the tyre axially.

The method in accordance with the invention for testing a tyre comprises the following steps:
- a) positioning a scanning head for scanning the tyre by means of a positioning means into a viewing position and orienting the scanning head in a viewing direction, and
- b) controlling the positioning means by means of a control and display means;
- c) inputting and/or outputting the coordinates of the position of the scanning head by means of the control and display means;
- d) defining the coordinates by a system of coordinates, the origin of which is located in the intersection of a tyre plane and a rolling axis extending through the centerpoint of the tyre in the axial direction.

The invention is based on having discovered for entering or displaying the spatial location of the scanning head the advantage of using coordinates based on a system of coordinates the origin of which is located in the intersection of tyre plane and rolling axis. It is in this way that the coordinates characterize the viewing position and viewing direction of the scanning head in a reference system specific the tyre concerned which is independent of the configuration of the positioning means and the location of the tyre during testing, rendering the results of testing obtained by difference testers comparable. The invention now makes it possible to define the viewing position and viewing direction of the scanning head relative to the tyre and to save them in a test routine specific to the tyre concerned. This test routine can then be loaded into the control and display means before commencing testing of the tyre for positioning the scanning head to the viewing position and orienting it in the viewing direction. Since the test routine is specific to the tyre concerned and does not depend on the testing device by means of which it was generated the tyres can be tested by the test routine also on other testers.

The coordinates are to advantage cylinder coordinates defining the viewing position of the scanning head spatially by the spacing of a point corresponding to the viewing position in the tyre plane from the origin (radius vector r), the angle including a beam passing through this point with the axis of the system of coordinates (polar angle $\phi$) and the height of the viewing position above the tyre plane.

The tyre plane is to advantage the centerplane of the tyre as is understood to be the plane extending through the middle of the tyre axially. When, as in most cases, the tyre has a symmetrical configuration then its centerplane corresponds to the plane of symmetry. But when the tyre has a non-symmetrical configuration, as is sometimes the case with aircraft tyres, or as described in German patent DE 199 44 314 A1 the tyre is tested lying and its sidewall on which the tyre lies is deformed by the weight of the tyre to a degree which cannot be ignored, then the centerplane of the tyre is expediently the plane passing through the middle of the rim width of the tyre axially or through the so-called crown of the tyre. If the magnitude of the width or of the rim width of the tyre as well as the crown of the tyre is unknown, then the origin of the system of coordinates is expediently located in the so-called machine basic level.

Preferably by means of the positioning means the scanning head is moveable axially and in this case the control and display means comprises a display field by means of which the spatial offset of the scanning head axially can be displayed. As an alternative or in addition thereto the control and display means may feature a user field for entering the axial spatial offset of the scanning head.

In a further preferred aspect of the device in accordance with the invention the scanning head is moveable radially by the positioning means. In this case the control and display means expediently features a display field for displaying the spatial offset of the scanning head in the radial direction and/or a user field for entering the spatial offset of the scanning head in the radial direction.

In another preferred aspect of the device in accordance with the invention the scanning head and the tyre are rotatable relative to each other about the rolling axis by the positioning means. The control and display means in this case expediently comprises a display field for displaying the angle of rotation of the scanning head relative to the tyre, in other words the polar angle. As an alternative or in addition thereto the control and display means may feature a user field for entering the angle of rotation of the scanning head relative to the tyre.

In still another preferred aspect of the device in accordance with the invention the scanning head is rotatable about a pivot axis oriented orthogonal to the rolling axis by means of the positioning means.

Preferably the scanning head is provided with an imaging optic assembly featuring an optical axis and a main point located on the optical axis. In this case it is of advantage when the viewing position is defined by the main point and the viewing direction by the optical axis, the viewing direction corresponding to a beam emanating from the main point and extending along the optical axis at the object side to the surface of the tyre to be tested. The optical axis and the plane of the tyre include an angle of inclination which may be 0° when the optical axis runs parallel to the plane of the tyre. The control and display means comprises to advantage a display field for displaying the angle of inclination and/or a user field for entering the angle of inclination defining the viewing direction.

Preferably a first positioner and a second positioner permit translational motion of the scanning head in, for example, the horizontal and vertical direction when the tyre is tested in a lying position. A third positioner and a fourth positioner permit to advantage rotational motion of the scanning head relative to the tyre. When the device in accordance with the invention features all four of these positioners, then the positioning means, features two translational and two rotational degrees of freedom ensuring exact positioning and orientation of the scanning head. Depending on the application the positioning means may comprise fewer than, or also more than four positioners. In addition to this it is possible to replace the first positioner and/or the second positioner by a positioner which endows the positioning means, not with a translational degree of freedom but a further rotational degree of freedom.

Preferably the control and display means which may be configured spatially separate from the scanning head and the positioning means and, for example, may be connected thereto via Internet, may include a computer, an input device for the user field and a monitor for the display field. The input device may be, for example, a keyboard, a mouse or a touchscreen. In this case it has been found to be of advantage when the control and display means comprises a user interface in which the display field is simultaneously a user field. Such a user interface can be realized, for example, by a graphics user surface displayed on the monitor.

To perform an interferometric scanning method the scanning head comprises to advantage an illuminator for illuminating the tyre, a shearing element by which the light beams reflected from the tyre are caused to become an interference pattern, and a camera provided with an objective lens arranged to receive the interference light beams in the beam path of the shearing element.

Details and further advantages of the invention read from the description of preferred example aspects shown simply diagrammatically in the drawings in which.

Figure 1:
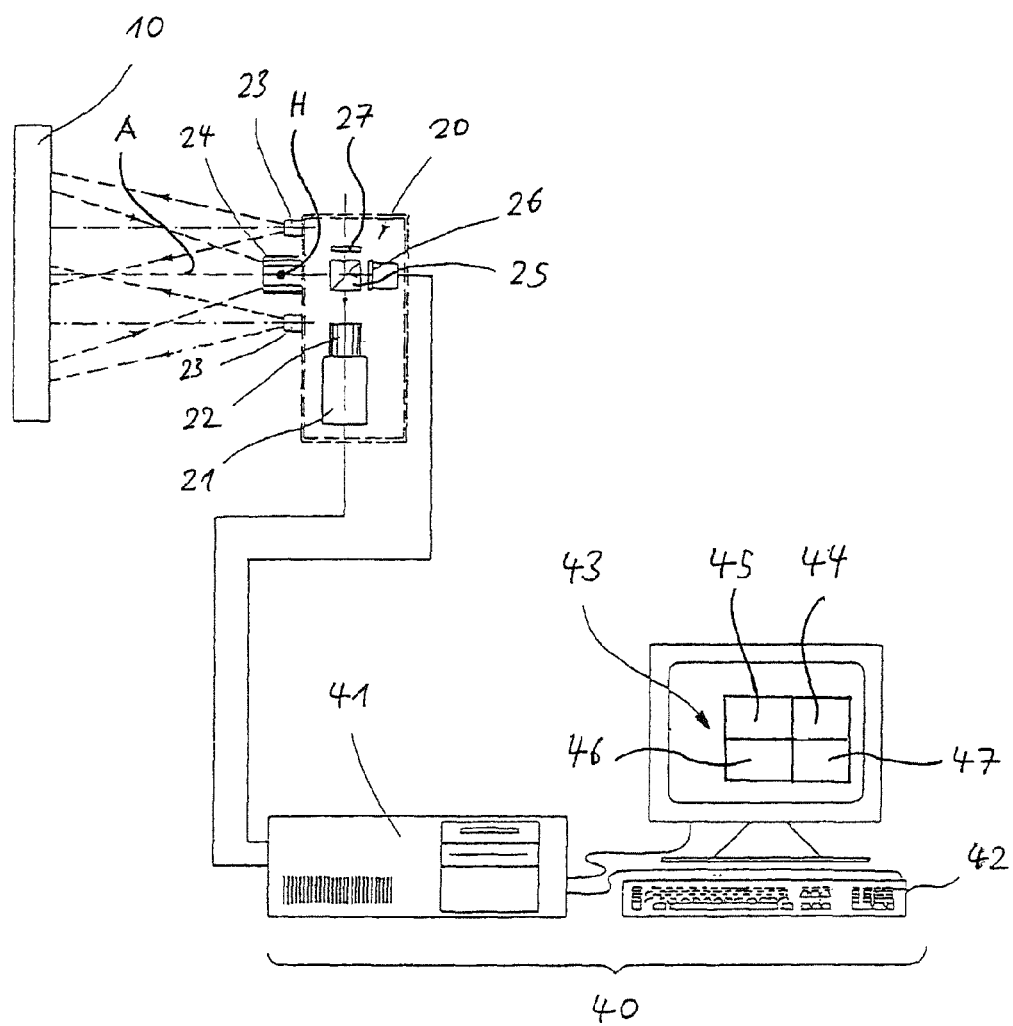
FIG. 1 is a diagrammatic illustration of the scanning head and the control and display means of a tyre testing device.
Figure 6:
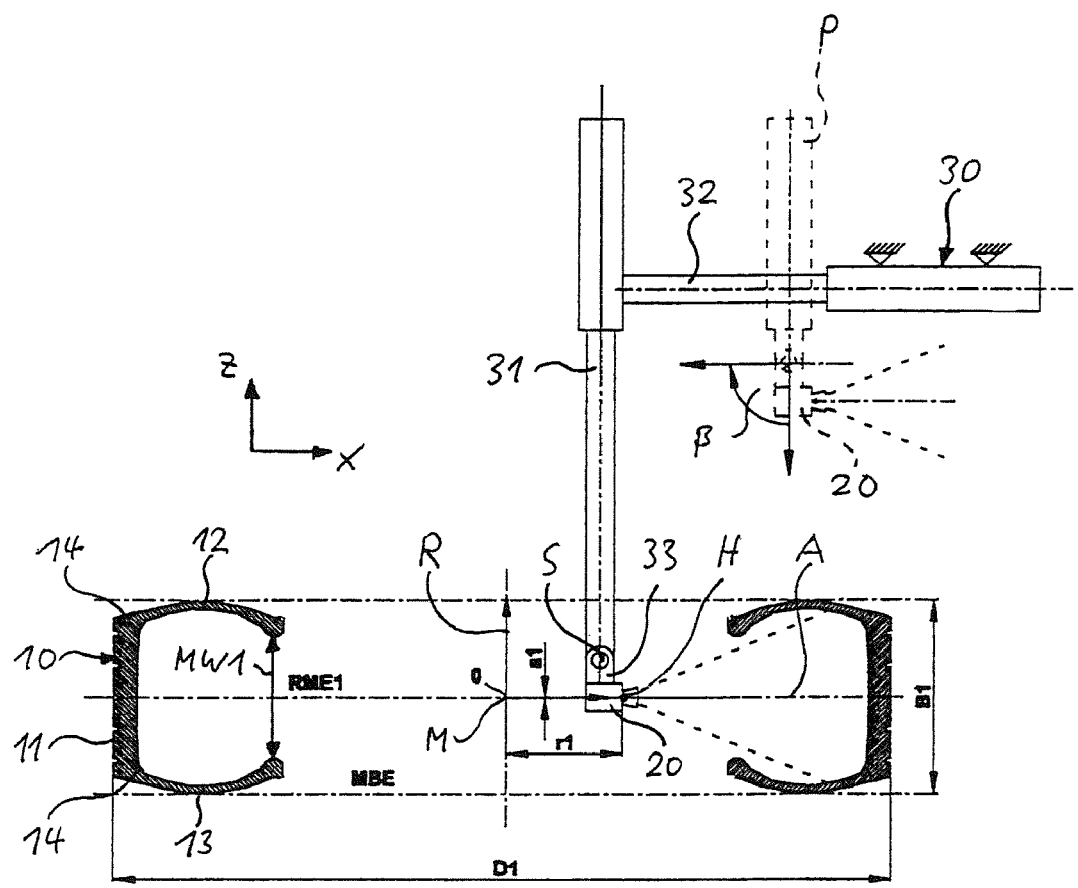
FIG. 6 is a view as shown in FIG. 2 showing the testing device in accordance with the invention.

Referring now to FIG. 1 there is illustrated the device for testing a tyre 10 by interferometric scanning which as evident from FIG. 6 in particular comprises for this purpose a scanning head 20, a positioning means 30 for positioning the scanning head 20 into a viewing position and orienting the scanning head 20 in a viewing direction, and a control and display means 40. To test the tyre 10 in two different conditions of deformation the tyre 10 may be located in a pressure chamber (not shown) as described for example in German patent DE 199 44 314 A1, although, however, the various deformation conditions of the tyre 10 must not be automatically prompted by a change in pressure in the pressure chamber but can be generated by any suitable ways and means.

As evident furthermore from FIG. 1 the scanning head 20 comprises an objective lens 24, a camera 21 provided with an objective lens 22 and a semiconductor sensor (not shown) for example a CCD or CMOS sensor, a plurality of laser diodes 23 functioning as an illuminator and a shearing element consisting of a beam splitter 25, a moveable mirror 26 and a stationary mirror 27. By means of the laser diodes 23 emitting coherent light the tyre 10 is illuminated, it usually being for testing the inner circumferential surface of the tyre 10 that both the region of the belting of the tyre 10 and the bead 14 of the tyre 10 located in the transition from the tread 11 to the sidewalls 12, 13 as what is called the crown shot that is illuminated. The sidewalls 12, 13 are generally illuminated from without. Where necessary the tread 11 can also be illuminated from without. The objective lens 24 represents an imaging optic assembly featuring an optical axis A and a main point H located on the optical axis A at the side of the object. The light beams reflected from the surface of the tyre 10 are received by means of the objective lens 24 and imaged on the shearing element 25, 26, 27 as well as being brought to interference with the aid thereof. The interference light beams are received by means of the objective lens 22 arranged in the beam path of the shearing element 25, 26, 27 as an interferogram and supplied to the semiconductor sensor of the camera 21 which processes the interferogram electronically.

The data generated by the electronic processing is passed on to the control and display means 40. The control and display means 40 comprises a computer 41 by means of which the data is saved and processed, an input device 42 in the form of a keyboard and a mouse (not shown) as well as a monitor 43 which depending on the application involved may be configured as a touchscreen in thus constituting an alternative or additional input unit.

The control and display means 40 serves, for one thing, to display the result in the form of images generated by the scanning head 20 by scanning the tyre 10. For another, the control and display means 40 has the function of controlling the positioning means 30 to position the scanning head 20 in a viewing position and to align it in an viewing direction. The viewing position and viewing direction of the scanning head 20 are defined for a certain type of tyre and saved by means of the computer 41 in a test routine. The test routine is loaded into the computer 41 every time a corresponding tyre 10 is to be tested, meaning that it is not necessary for testing a tyre 10 for flaws to previously define the viewing position and viewing direction every time, it instead being sufficient for this purpose once a test routine has been created specific to the tyre concerned. To create the test routine it may be necessary to establish the optical axis A and/or the main point H as relevant to the scanning head 20 being used. In this case the optical axis A or the main point H are calibrated expediently by the positioning means 30 with the aid of, for example, a calibrator.

Figure 7:
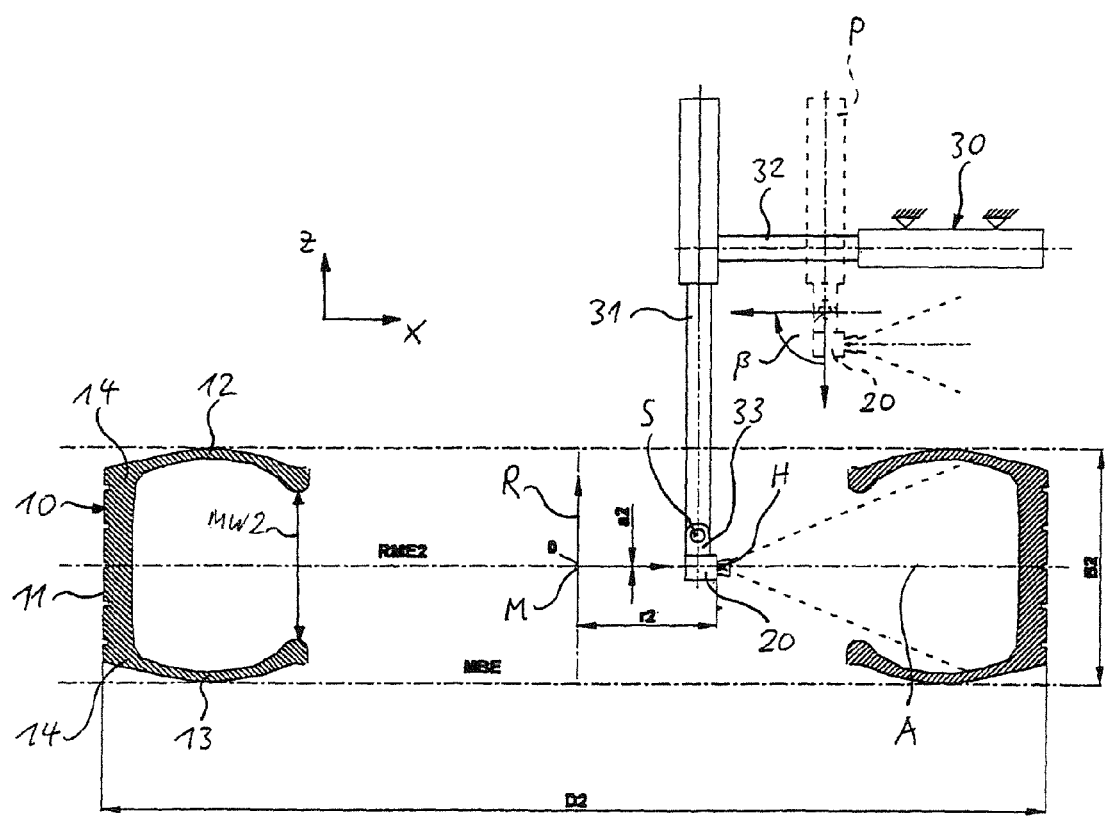
FIG. 7 is an illustration as shown in FIG. 3 showing the testing device in accordance with the invention.

Referring now to FIGS. 6 and 7 there is illustrated in particular how the positioning means 30 comprises a first positioner 31 for moving the scanning head 20 in an axial direction z of the tyre 10. When the tyre 10 is tested in the lying position, then the axial direction z is oriented vertically. The positioning means 30 comprises furthermore a second positioner 32 for moving the scanning head 20 in a radial direction x of the tyre 10. The radial direction x is oriented horizontal when the tyre 10 is tested in the lying position. In addition, the positioning means 30 features a third positioner (not shown) for rotating the scanning head 20 and the tyre 10 relative to each other about a rolling axis R extending in the axial direction z through the centerpoint M of the tyre 10. This third positioner can be achieved for example as a turntable on which the tyre 10 is arranged lying. The positioning means 30 comprises in conclusion a fourth positioner 33 for rotating the scanning head 20 about a pivot axis S oriented orthogonal to the rolling axis R.

Figure 4:
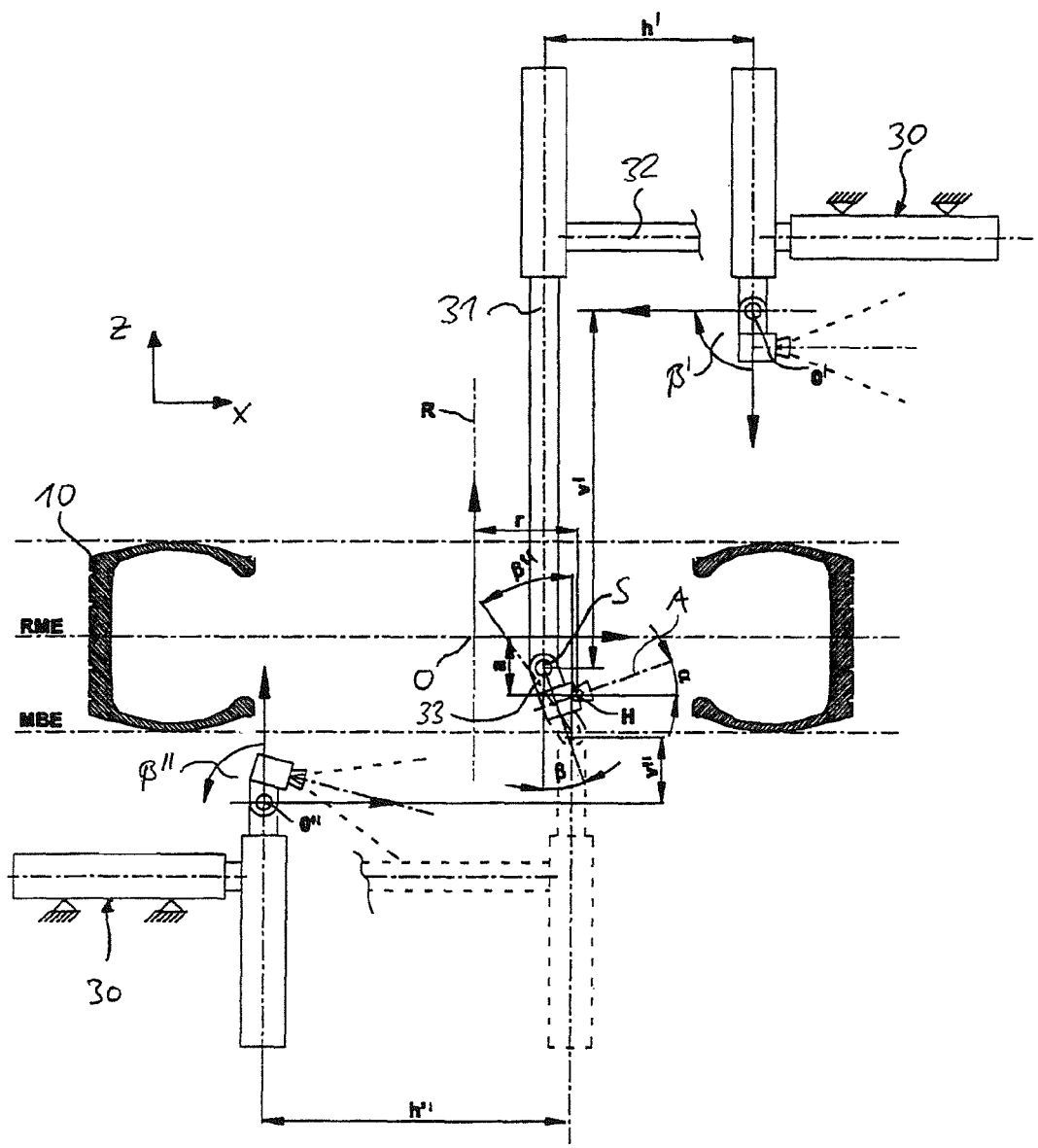
FIG. 4 is an illustration as shown in FIG. 2 showing the difference between a prior art testing device and the testing device in accordance with the invention.

Referring now to FIG. 4 there is illustrated how the first positioner 31 produces the spatial offset of the scanning head 20 in the axial direction z and the second positioner 32 produces the spatial offset of the scanning head 20 in the radial direction x relative to the main point H of the objective lens 24 at the object side and in a system of coordinates, the origin 0 of which is located at the intersection of the rolling axis R and a centerplane RME of the tyre. As evident from FIGS. 6 and 7 the rolling axis R passes through the centerpoint M of the tyre 10, as a result of which the spacing of the rolling axis R from the tread 11 of the tyre 10 amounts to half the diameter $D_1$, $D_2$ of the tyre 10. The centerplane $RME_1$, $RME_2$ of the tyre extends in the axial direction z in the middle of rim width $MW_1$, $MW_2$ of the tyre 10. When the tyre 10 has a symmetrical configuration the centerplane $RME_1$, $RME_2$ of the tyre simultaneously extends through the middle of the width $B_1$, $B_2$ of the tyre 10 as shown in FIGS. 6 and 7. When the tyre 10 is tested positioned lying and thus one of the sidewalls 12, 13 of the tyre 10 is at the machine basic level MBE then it may happen, especially where relatively heavy tyres 10 are involved, that the sidewall 13 is deformed by the weight of the tyre 10 to an extent which can no longer be ignored. When this happens the middle of the rim width $MW_1$, $MW_2$ and the middle of the width $B_1$, $B_2$ measured in the unloaded condition of the tyre 10 fall part. To attain comparable results in testing the tyre, the centerplane RME defining the origin 0 then extends in the middle of the rim width $MW_1$, $MW_2$ or through the crown of the tyre 10. As an alternative in such a case the origin 0 of the system of coordinates can be placed in the intersection between the rolling axis R and the machine basic level MBE, the latter also being useful when the dimensions of the width $B_1$, $B_2$ and rim width $MW_1$, $MW_2$ of the tyre 10 as well as the location of the crown of the tyre 10 are unknown.

Figure 5:
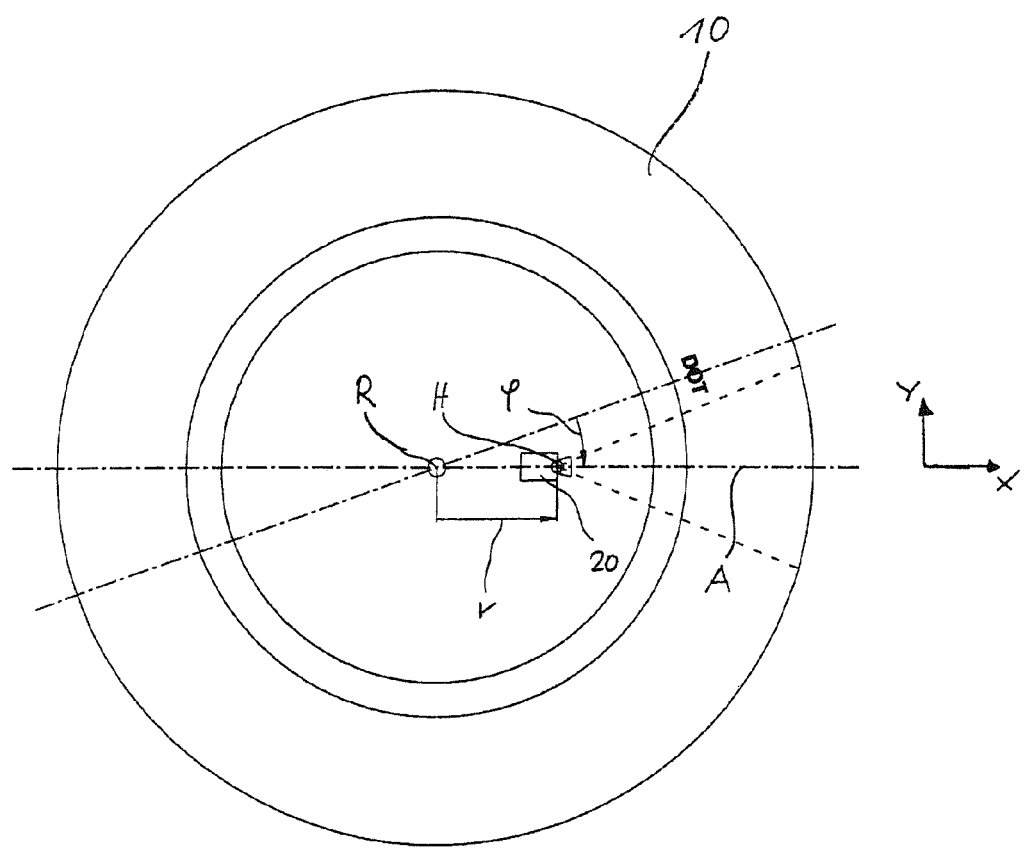
FIG. 5 is top-down view of the tyre testing device in accordance with the invention.

Referring now to FIG. 5 there is illustrated how the angle of rotation φ of the scanning head 20 prompted by the third positioner extends relative to the tyre 10 in the tyre centerplane RME. The crown of the angle of rotation φ lies in the origin 0 of the system of coordinates, one leg of the angle of rotation φ corresponding to a coordinate axis of the system of coordinates passing expediently through a selected marking of the tyre 10 which in this case is the DOT number indicating, among other things, the production date of the tyre 10. The pivot angle β of the rotation of the scanning head 20 prompted by the fourth positioner 33 about the pivot axis S is referenced relative to a plane in which the rolling axis R is located and is rotated in the circumferential direction of the tyre 10 from the coordinate axis by the angle of rotation φ, resulting in the pivot axis S being parallel to the tangent at the tyre 10 in the corresponding position of the scanning head 20.

Referring now to FIG. 4 there is illustrated how the main point H of the objective lens 24 is arranged offset from the pivot axis S, resulting in a rotation of the positioner 33 by the angle of rotation φ not being sufficient to orient the scanning head 20 in the wanted viewing position without changing the viewing position. Instead, the positioners 31 and 32 need to be moved in addition to attain the viewing position when setting the angle of inclination α between the optical axis (A) defining the viewing position and the tyre centerplane RME.

The control and display means 40 has a graphics user control surface which, as evident from FIG. 1, is represented by the monitor 43. The graphics user control surface features display field 44, 45, 46 by means of which the axial offset a, the radial offset and the angle of rotation φ and thus the coordinates of the viewing position of the scanning head 20 are displayed and entered. The control and display means 40 comprises in addition a display field 47 by means of which the angle of inclination α and thus the viewing position of the scanning head 20 is displayed and entered.

Figure 2:
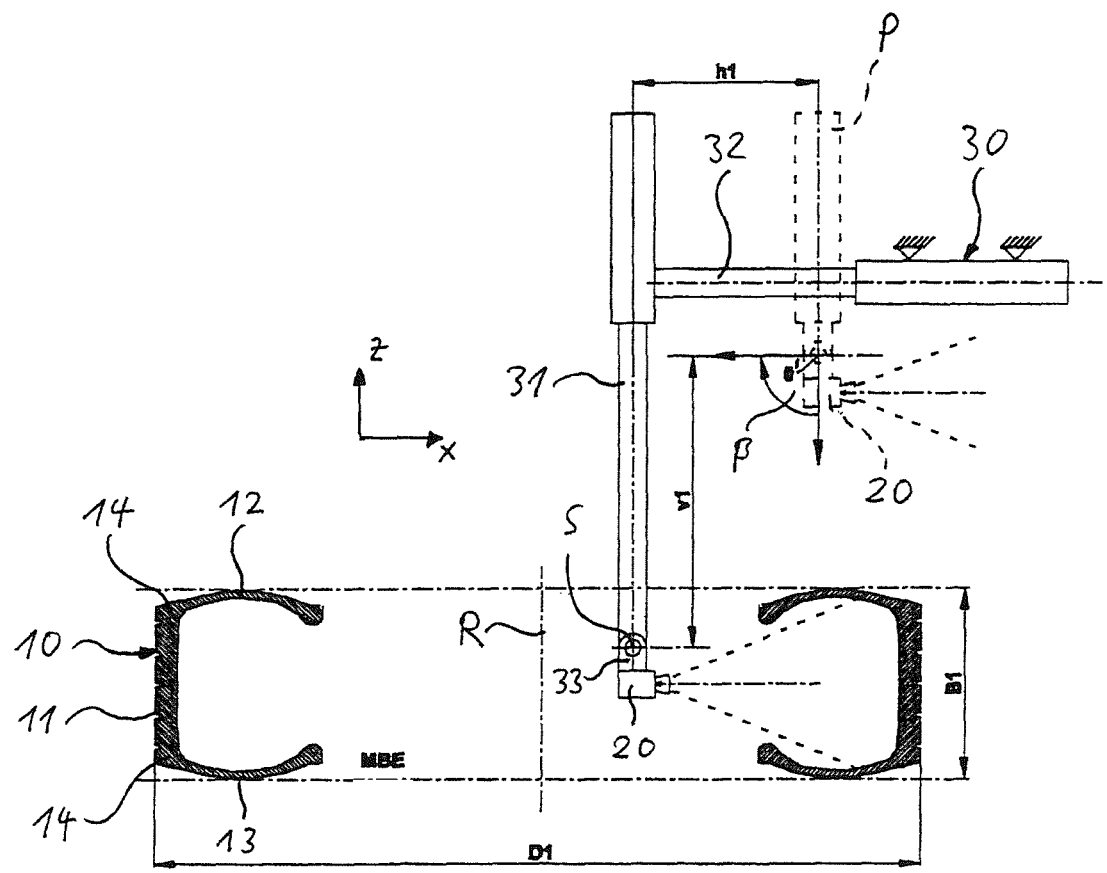
FIG. 2 is a diagrammatic illustration of a positioning means of a prior art testing device and a cross-section through a tyre to be tested by such a testing device, the tyre having a first size.
Figure 3:
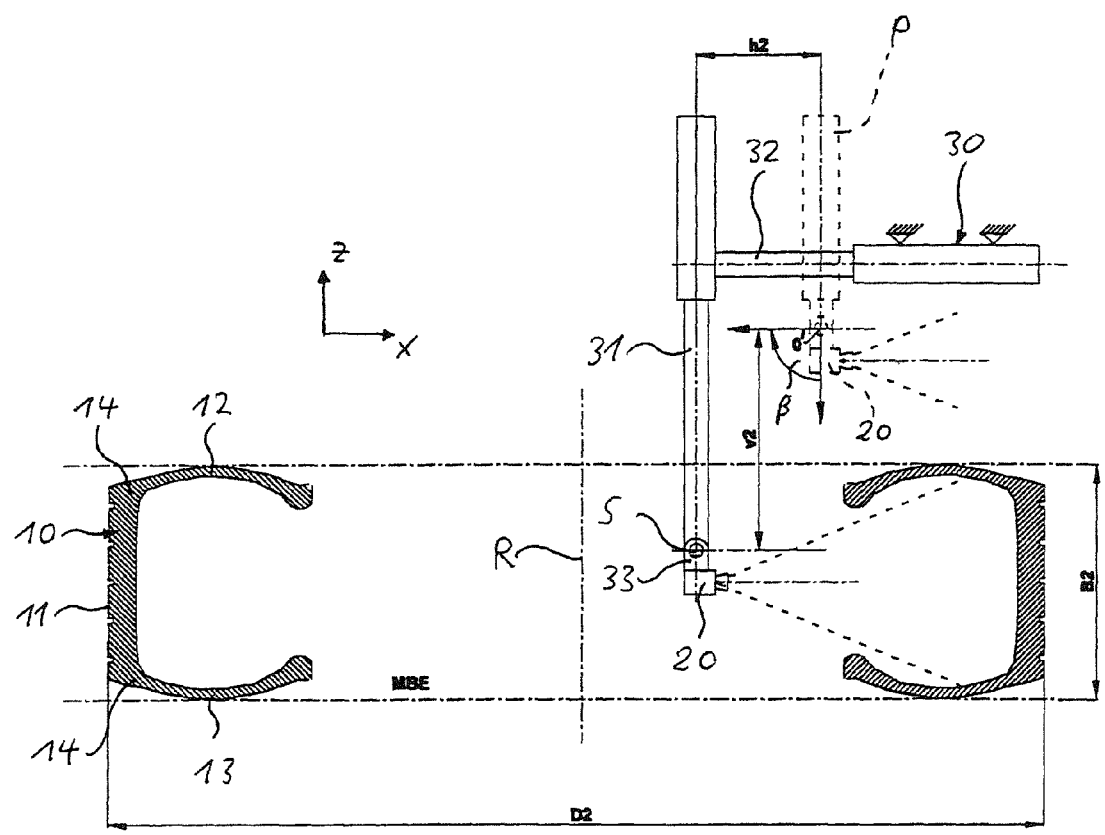
FIG. 3 is an illustration as shown in FIG. 2 showing a tyre to be tested by a prior art testing device, the tyre having a second size.

The device as described above for testing the tyre 10 is characterized by a tyre-specific reference system which is independent of the configuration of the positioning means 30 and the location of the tyre 10 during testing. This becomes particularly clearly evident when comparing the prior art device as shown in FIGS. 2 and 3 to the device in accordance with the invention as shown in FIGS. 6 and 7. In the prior art device as shown in FIGS. 2 and 3 the coordinates of the position of the scanning head 20 are defined by a system of coordinates, the origin 0' of which is in a starting position of the positioning means 30 about the tyre 10 used also as a rule as the parking position P. When ignoring the relative rotation of the scanning head 20 and tyre 10 about the rolling axis R then the spatial location of the scanning head 20 is determined by the horizontal offset $h_1$, $h_2$ of the positioner 32 and the vertical offset $v_1$, $v_2$ of the positioner 31. As evident from FIGS. 2 and 3 both the horizontal offset $h_1$, $h_2$ and the vertical offset $v_1$, $v_2$ as needed to bring the scanning head 20, for example, into the viewing position for a crown shot, as shown in FIGS. 2 and 3, depending on the location of the tyre 10 on the machine basic level MBE and the distance of the origin 0' from the machine basic level MBE.

Referring now to FIG. 4 there is illustrated how the starting position of the positioning means 30 of prior art devices and thus the location of the origin 0', 0" of the system of coordinates may differ so that knowing the horizontal offset h', h", the vertical offset v', v" and pivot angle β', β" without knowing the location of the origin 0', 0" provides no information as to the position and viewing position of the scanning head 20. The resulting scans of the different testers thus bear no comparison.

Referring now to 6 and 7 again it is obvious how, unlike the above, the axial offset $a_1$, $a_2$ and the radial offset $r_1$, $r_2$ of the positioning means 30 of the device in accordance with the invention simply depend on the size of the tyre 10, i,e, the diameter $D_1$, $D_2$ and the width $B_1$, $B_2$ thereof. The coordinates of the main point H correspond to the axial offset $a_1$, $a_2$ and the radial offset $r_1$, $r_2$ and thus the viewing position of the scanning head 20 are specific to the tyre concerned. The same applies to the viewing position of the scanning head 20 too, which is dictated by the angle of inclination a of the optical axis A and by the pivot angle β which depend on the starting position of the positioner concerned so that the results of testing tyres the same in size are comparable even when the resulting scans stem from devices which differ in the starting position of the positioning means 30.

Last but not least, the device in accordance with the invention now makes it possible to compensate deviations in the beam path of the imaging optics assembly in thus eliminating directional errors.

LIST OF REFERENCE NUMERALS

10 tyre
11 tread
12 sidewall
13 sidewall
14 bead
20 scanning head
21 camera
22 objective lens
23 laser diode
24 objective lens
25 beam splitter
26 moveable mirror
27 stationary mirror
30 positioning means
31 positioner
32 positioner
33 positioner
40 controller and display means
41 computer
42 input device
43 monitor
44 display/user field
45 display/user field
46 display/user field
47 display/user field
0 origin
0' origin
0" origin
A optical axis
$B_1$ width
$B_2$ width
$D_1$ diameter
$D_2$ diameter
DOT marking
H main point
M centerpoint MBE machine basic level
MW$_1$ rim width
MW$_2$ rim width
P parking position
R rolling axis R
RME tyre center plane
RME$_1$ tyre center plane
RME$_2$ tyre center plane
S pivot axis S
a axial offset
a$_1$ axial offset
a$_2$ axial offset
h' horizontal offset
h" horizontal offset
h$_1$ horizontal offset
h$_2$ horizontal offset
r radial offset
r$_1$ radial offset
r$_2$ radial offset
v' vertical offset
v" vertical offset
v$_1$ vertical offset
v$_2$ vertical offset
x horizontal direction
z vertical direction
α angle of inclination
β pivot angle
β' pivot angle
φ angle of rotation

The invention claimed is:

1. A device for optically testing a tire characterized by a centerpoint, a width extending in an axial direction and a diameter located in a tire plane orthogonal to the axial direction, comprising:
 a scanning head for scanning the tire comprising an imaging optic assembly having an optical axis;
 a positioning means for positioning the scanning head in a viewing position and orienting the scanning head in a viewing direction being defined by the optical axis;
 a control and display means for controlling the positioning means;
 the control and display means comprising at least one user field for entering the coordinates of the position of the scanning head and at least one display field for displaying the coordinates of the position of the scanning head; and
 the coordinates being defined by a system of coordinates specific to the tire whose origin is located in the intersection of a tire plane and a rolling axis extending through the centerpoint of the tire in the axial direction.

2. The device as set forth in claim 1, in which the scanning head is moveable in the axial direction by the positioning means.

3. The device as set forth in claim 2, in which the control and display means comprises a display field for displaying the spatial offset of the scanning head in the axial direction.

4. The device as set forth in claim 2, in which the control and display means comprises a display field for entering the spatial offset of the scanning head in the axial direction.

5. The device as set forth in claim 1, in which the scanning head is moveable in the radial direction by the positioning means.

6. The device as set forth in claim 5, in which the control and display means comprises a display field for displaying the spatial offset of the scanning head in the radial direction.

7. The device as set forth in claim 5, in which the control and display means comprises a display field for entering the spatial offset of the scanning head in the radial direction.

8. The device as set forth in claim 1, in which the scanning head and the tire are rotatable relative to each other about the rolling axis by the positioning means.

9. The device as set forth in claim 8, in which the control and display means comprises a display field for displaying the angle of rotation of the scanning head relative to the tire.

10. The device as set forth in claim 8, in which the control and display means comprises a user field for entering the angle of rotation of the rotation of the scanning head relative to the tire.

11. The device as set forth in claim 1, in which the scanning head is rotatable about a pivot axis oriented orthogonal to the rolling axis by the positioning means.

12. The device as set forth in any of the claims 1 to 11, in which the scanning head comprises a main point located on the optical axis, the viewing position being defined by the main point.

13. The device as set forth in claim 12, in which the optical axis and the tire plane include an angle of inclination, the control and display means comprising a display field for displaying the angle of inclination or a user field for entering the angle of inclination.

14. The device as set forth in claim 1, in which the control and display means comprises a computer, an input device and a monitor.

15. The device as set forth in claim 1, in which the control and display means comprises a user interface in which the display field doubles as a user field.

16. The device as set forth in claim 1, in which the scanning head comprises an illuminator for illuminating the tire, a shearing element for producing an interference from the light beams reflected by the tire, a camera, the camera being provided with an objective lens arranged for receiving the interfering light beams in the beam path of the shearing element.

17. The device as set forth in claim 1, in which the viewing position and the viewing direction of the measuring head are saved in a test routine specific to the tire which is loaded into the control and display means for the tire to be tested.

18. A method for optically testing a tire characterized by a centerpoint, a width extending in an axial direction and a diameter located in a tire plane orthogonal to the axial direction, comprising the following steps in the method:
 positioning a scanning head for scanning the tire comprising an imaging optic assembly having an optical axis by means of a positioning means in a viewing position and orienting the scanning head in a viewing direction being defined by the optical axis;
 controlling the positioning means by means of a control and display means;
 inputting or outputting the coordinates of the position of the scanning head by means of a control and display means and
 defining the coordinates by a system of coordinates specific to the tire whose origin is located in the intersection of a tire plane and a rolling axis extending through the centerpoint of the tire in the axial direction.

19. The method as set forth in claim 18, in which:
 the scanning head is moved by means of the positioning means in an axial direction;
 the scanning head is moved by means of the positioning means in a radial direction;
 the scanning head and the tire are rotated by means of the positioning means relative to each other about the rolling axis; or the scanning head is rotated by means of the positioning means about a pivot axis oriented orthogonal to the rolling axis.

20. The method as set forth in claim 19, in which by means of at least one display field of the control and display means or by means of at least one user field of the control and display means:

the spatial offset of the scanning head in the axial direction;

the spatial offset of the scanning head in the radial direction;

the angle of rotation of the rotation of the scanning head relative to the tire; or an angle of inclination between the optical axis and the tire plane is displayed or entered.

21. The method as set forth in claim 20, in which the angle of rotation of the scanning head is displayed relative to a predefined marking of the tire, preferably a number indicating the production date of the tire.

22. The method as set forth in claim 18, in which the scanning head comprises an imaging optic assembly having an optical axis and a main point located on the optical axis, the viewing position being defined by the main point and the viewing direction by the optical axis.

23. The method as set forth in claim 22, in which the optical axis or the main point is calibrated by the positioning means.

24. The method as set forth in claim 18, in which the tire is illuminated by means of an illuminator of the scanning head, the light beams reflected from the tire being rendered into interference by means of a shearing element of the scanning head and the camera being provided with an objective lens arranged for receiving the interfering light beams in the beam path of the shearing element.

25. The method as set forth in claim 18, in which the viewing position and the viewing direction of the measuring head are saved in a test routine specific to the tire which is loaded into the control and display means for the tire to be tested.

* * * * *